Figures 1, 7:
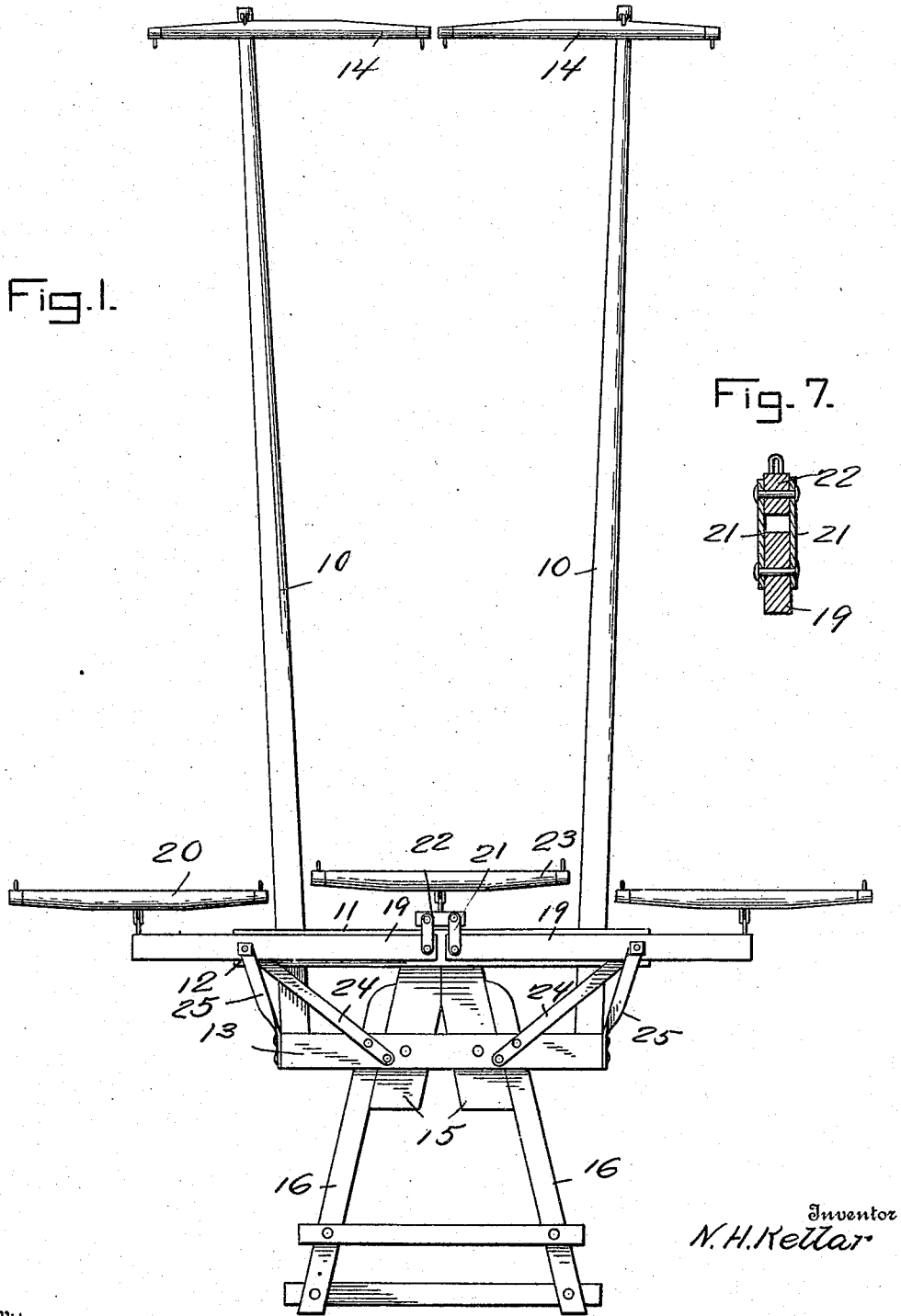

N. H. KELLAR.
THREE HORSE HITCH EQUALIZER.
APPLICATION FILED MAR. 4, 1907.

933,310.

Patented Sept. 7, 1909.
3 SHEETS—SHEET 1.

Witnesses
G. R. Thomas
M. F. Miller

Inventor
N. H. Kellar

By Chandler & Chandler
Attorneys

N. H. KELLAR.
THREE HORSE HITCH EQUALIZER.
APPLICATION FILED MAR. 4, 1907.
933,310.
Patented Sept. 7, 1909.
3 SHEETS—SHEET 2.
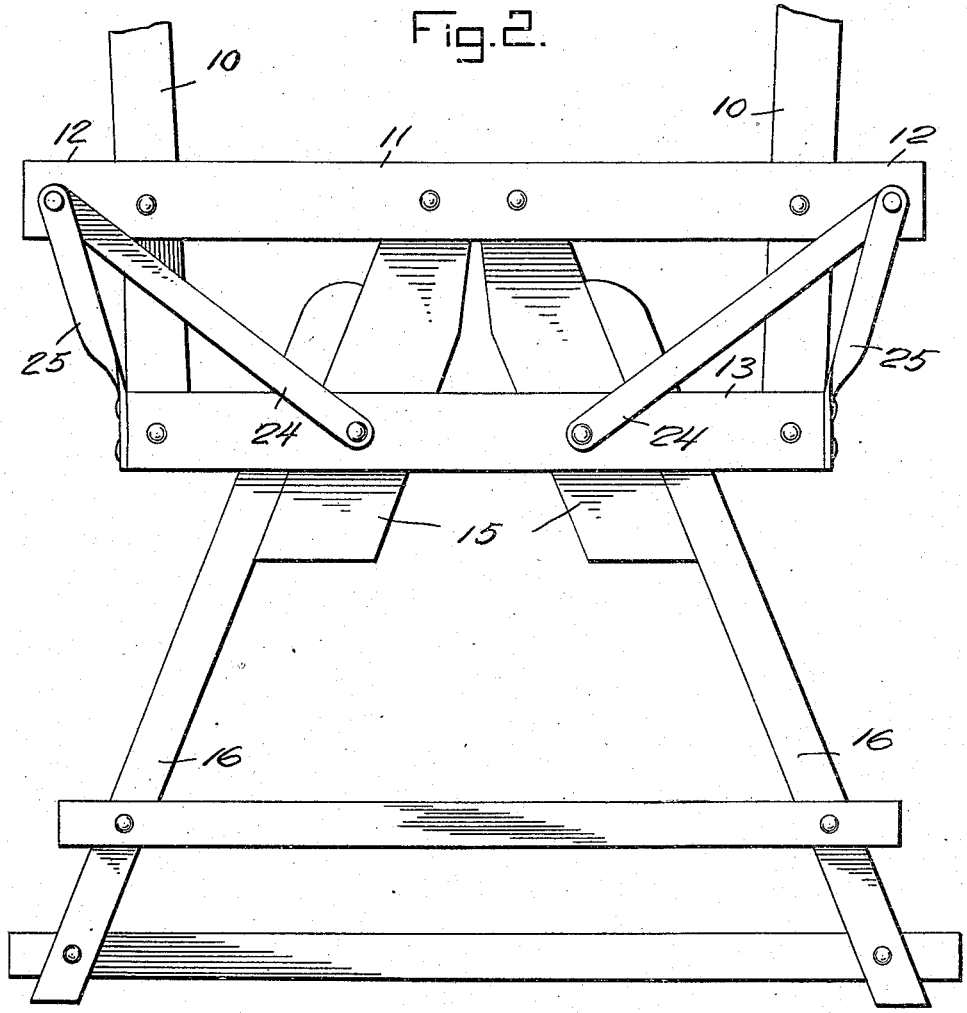
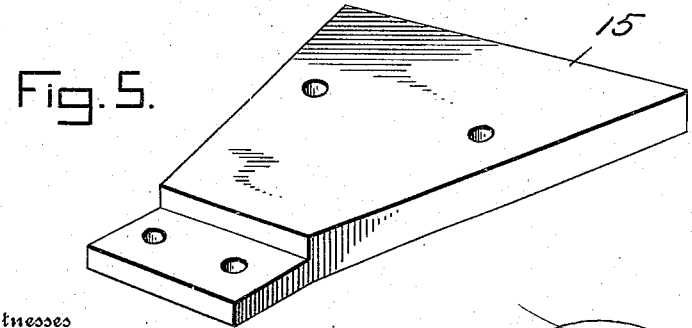

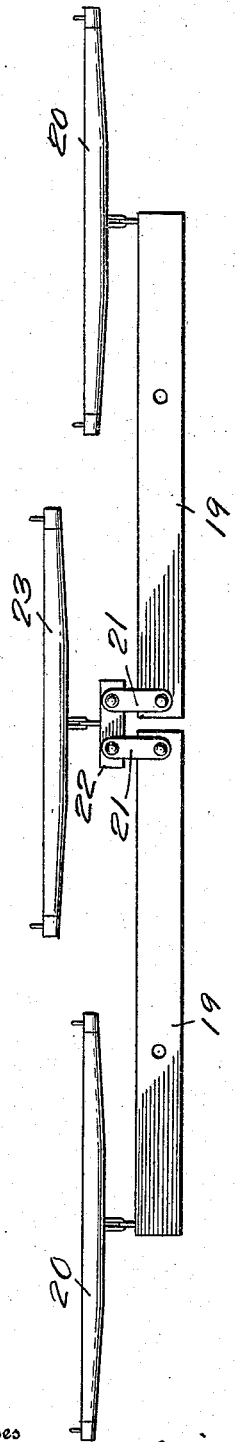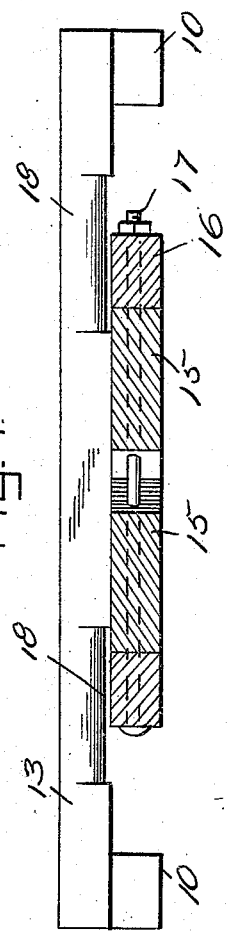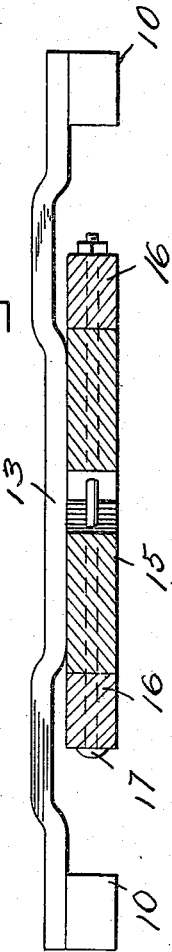

UNITED STATES PATENT OFFICE.

NORMAN H. KELLAR, OF ALTA, ILLINOIS.

THREE-HORSE HITCH-EQUALIZER.

933,310.   Specification of Letters Patent.   Patented Sept. 7, 1909.

Application filed March 4, 1907. Serial No. 360,412.

*To all whom it may concern:*

Be it known that I, NORMAN H. KELLAR, a citizen of the United States, residing at Alta, in the county of Peoria, State of Illinois, have invented certain new and useful Improvements in Three-Horse Hitch-Equalizers; and I do hereby declare the following to be a full, clear, and exact description of the invention, such as will enable others skilled in the art to which it appertains to make and use the same.

This invention has relation to three-horse hitch draft-equalizers for wagons equipped with hounds.

The invention has for its objects, first, the provision of improvements whereby the stub, through the intervention of which the hitch is made to wagons, can be arranged and adjusted in order to suit wagons of different styles and sizes: second, the provision of improvements whereby the ends of the poles may be allowed to rise and fall without interference with the hounds; third, the provision of improvements connecting the middle whiffletree with the evener devices, by which advantages are gained; and fourth, improvements in the arrangement of the poles and their connecting parts.

The general nature of the invention may be ascertained from an inspection of the devices portrayed in the annexed drawings, forming a part of this specification, in view of which it will first be described in detail and then be pointed out in the subjoined claims.

Of the said drawings—Figure 1 is a plan of the invention. Fig. 2 is a plan of the rear portion of the device, showing the hounds in connection therewith, drawn to an enlarged scale. Fig. 3 is a separate view of the draft equalizer proper. Fig. 4 is a rear view of the rear cross bar to the outer ends of which the rear extremities of the poles are connected, the hounds and stub bars being shown in vertical section. Fig. 5 is a perspective view of a modified form of the stub. Fig. 6 is a view, similar to Fig. 4, but showing a modified form of the rear cross-bar. Fig. 7 is an enlarged sectional view through one of the eveners and the draft bar.

Similar numerals of reference designate similar parts or features, as the case may be, wherever they occur.

In the said drawings 10 designates the poles which are connected at their rear portions to the forward cross-bar 11 which extends at its ends 12 beyond the sides of the poles and at their rear extremities the poles are connected to the ends of the rear cross-bar 13, the poles lying below the cross bar. The connection of the poles with the cross-bars is such as to bring their rear portions closer together than their front ends.

14 designates the yokes connected with the front ends of the poles by usual or suitable means in such manner that substantially one-third of their lengths will extend outside the poles, to be yoked to the outside horses, and substantially two-thirds will extend inside of the poles to be yoked to the middle horse.

15 designates the stub, which, in the preferred form, consists of two stout flat pieces of timber converging at their forward ends where they are secured to the under side of the front cross-bar 11, and at their divergent rear ends they extend under and are secured to the rear cross-bar 13.

16 designates the hounds of the running gear of a wagon, (forming a part of this improvement) which at their forward portions extend along the outer sides of the stub parts 15, and are pivoted to them by the transverse queen-bolt 17.

The under side of the cross-bar 13 is slightly rounded, as shown at 18, where the hounds 16 pass under said cross-bar so as to allow the front ends of the poles to rise and fall without affecting the position of the hounds or other parts of the running gear.

19 designates the two evener-bars which are pivotally attached on the outer ends 12 of the cross-bar 11, approximately one-third of the length of each extending outward from their pivotal points and two-thirds extending inward. A whiffletree 20 is shackled to the outer ends of the cross-bars or eveners 19, and the inner ends of the latter are provided with clips 21 connected thereto in a pivotal manner, which clips are connected in a like manner to the ends of a short draft bar, 22, to the center of which a whiffletree 23 is shackled for hitching the middle horse thereto.

24 designates iron braces extending from the inner portion of the rear cross-bar 13 divergently to the pivotal points connecting the evener bars with the front cross-bar 11. These braces 24 are further bolted to the stub end so that the braces serve as means to connect the rear cross bar and stub ends with the outer end of the forward cross bar.

25 are other braces secured at one end to the ends of the rear cross bar, their other ends extending out over the evener-bars 19 at the point of their pivotal connection with the ends 12 of the forward cross-bar 11. The eveners 19 are thus carried between the forward end of the braces just described on the forward cross bar.

The stub 15 is preferably made in two pieces so that it may be fitted to any wagon. To this end the divergent ends of the pieces constituting the stub, are adjusted on the queen-bolt farther apart or closer together to vary their fit. Where the stub is made in one piece, as shown in Fig. 5, of course no adjustment can be effected but it will be secured in place the same as where the stub is made of two parts.

The back cross-bar 13, being arranged over the queen-bolt, gives the effect of pivoting the rear ends of the poles on the queen bolt also, so that the front ends of the poles may rise and fall without binding on the hounds. This is of importance, because if the poles were made rigid with respect to the hounds or running gear, the wagon could not be advantageously employed about a farm or on public works or elsewhere where there are ditches, embankments or the like to cross.

I have shown the middle whiffletree as connected to the inner ends of the evener-bars 19, through the intervention of a short draft bar 22 and clips securing its ends pivotally to the opposite inner ends of the evener bars. This construction is also important since it performs an important part in distributing the work evenly on the three horses. Usually the middle whiffletree has been shackled to the evener by one or two devices, as clevices, without a draft bar 22. Through the medium of the bar 22 and its specified connections one outside horse may fall back or get ahead somewhat without affecting the evenness of draft on the three.

The poles or tongues 10 are brought closer together at their rear ends and diverge at their forward ends to give the horses an equal share of neck weight and play of the yokes and so that they can back and move to turn the wagon with readiness and by means of the specified construction, arrangement and connection of the whiffletree, the ends of the middle whiffletree is brought into line with the outer ones on the poles without having their ends overlap. In the present case the yoke and evener-bar are both made in sections and the work at both ends equalized.

As shown in Fig. 6 the back bar, instead of being constructed as a bar notched on its under side, or otherwise constructed to raise it above the hounds, may be formed of a bar of metal, 13, extending from end to end at the extreme rear ends of the poles and curving over the hounds. In some instances this form may be preferred.

By the foregoing it is to be noted that changes may be made in the form and arrangement of parts, within the scope of mechanical skill, without departing from the nature or spirit of the invention.

What is claimed is—

The combination with a pair of hounds; of stub ends held between said hounds and projecting forward thereof; a rear cross bar extending across said hounds and the rear end of said stub; a pair of poles attached to said rear cross bar and extending forwardly therefrom, said poles being attached beneath the extreme ends of said cross bar; a forward cross bar attached to the forward end of said stub ends and extending across and beyond said poles and united thereto at the crossing points; braces connecting said rear cross bar and stub ends with the outer ends of said forward cross bar; other braces connecting the outer ends of said rear cross bar with the outer ends of said forward cross bar; two eveners pivotally mounted between said braces on said forward cross bar; a link secured to the inner end of each evener; a draft bar secured to said links; and a whiffle-tree secured to said draft bar and the outer end of each of said eveners, all arranged as disclosed.

In testimony whereof, I affix my signature, in presence of two witnesses.

NORMAN H. KELLAR.

Witnesses:
H. E. CHARLES,
H. H. LEECH.